Dec. 16, 1969  H. BECKER ET AL  3,484,149

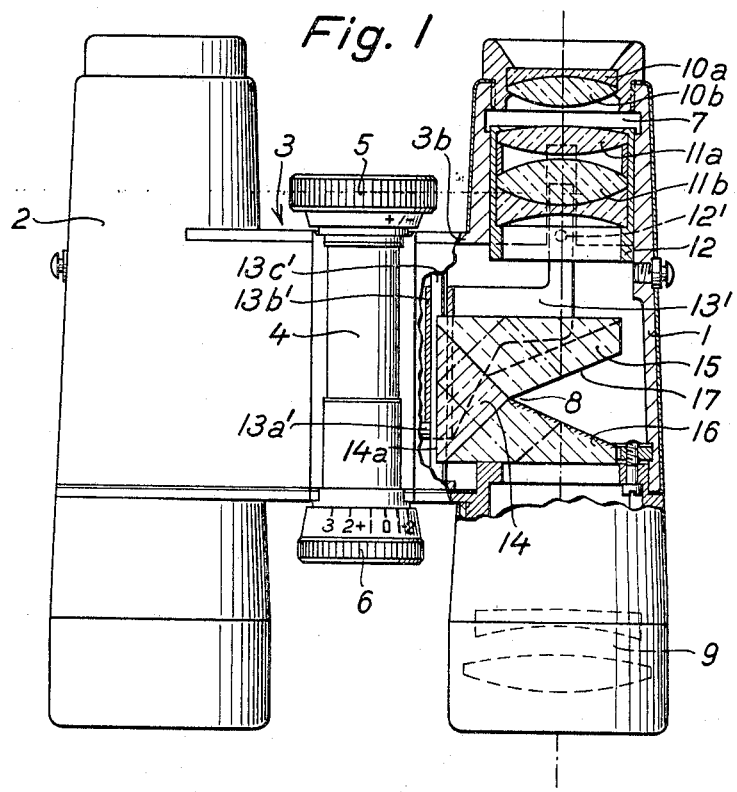
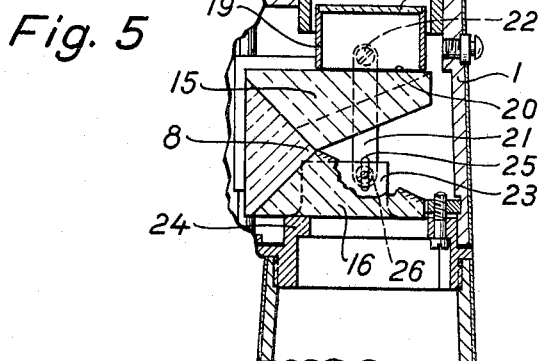
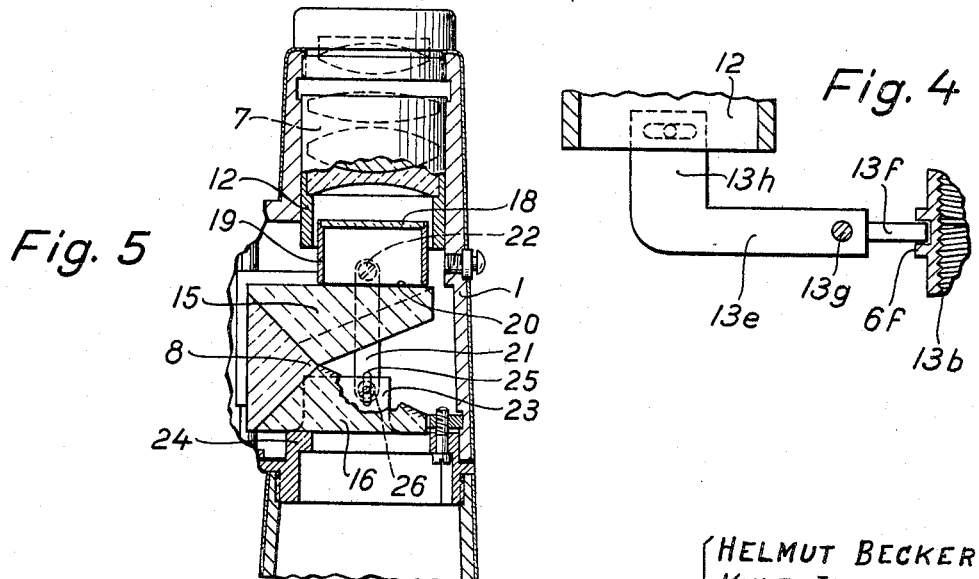

CENTER FOCUSING PRISM BINOCULAR AND RETICLE

Filed April 13, 1967  2 Sheets-Sheet 2

INVENTORS
HELMUT BECKER
KURT JENSEN
ERNST LEITZ
WALTER RINKER

BY Krafft & Wells
ATTORNEYS

United States Patent Office 3,484,149
Patented Dec. 16, 1969

3,484,149
**CENTER FOCUSING PRISM BINOCULAR
AND RETICLE**
Helmut Becker, Kurt Jensen, Ernst Leitz, and Walter
Rinker, Wetzlar, Germany, assignors to Ernst Leitz
G.m.b.H., Wetzlar (Lahn), Germany
Continuation-in-part of application Ser. No. 245,080,
Dec. 17, 1962. This application Apr. 13, 1967, Ser.
No. 630,637
Int. Cl. G02b 7/06, 27/32, 7/04
U.S. Cl. 350—76                                    2 Claims

ABSTRACT OF THE DISCLOSURE

A center focusing prism binocular with centrally located adjusting means to compensate for vision differences of the two eyes and comprising two articulated casing sections with an objective in fixed position at the outer end of each section, a prism system with five internal reflections in each casing, a reticule seated directly on the prism nearest the ocular, and a three-lens eyepiece in the rear end of each casing, the lens nearest the eye being mounted in fixed position in the casing while the two remaining lenses are mounted in a sleeve that is longitudinally movable in the casing, the optical paths in front of and behind the prism system being in alignment with each other.

CROSS-REFERENCES TO RELATED APPLICATIONS

The present application is a continuation-in-part of application Ser. No. 245,080, now abandoned filed Dec. 17, 1962, entitled "Prism Binocular." Applicants claim priority under 35 U.S.C. 119 for application Ser. No. L 31, 295/42h, filed Feb. 15, 1962, in the Federal Republic of Germany.

BACKGROUND OF THE INVENTION

The field of the invention is center focusing prism binoculars.

The state of the art upon which the present invention is an improvement is illustrated by the disclosure of Kurt Jensen in U.S. Patent No. 2,811,895, issued Nov. 5, 1957, the disclosure of which is incorporated herein. According to the prior art disclosed by Jensen, the adjustable elements of the focusing mechanism of a prism binocular are contained within the body structure. The adjustable elements comprise the inner optical member of a two-part objective. With this arrangement the mounting is not adapted to receive other objectives such as those having a higher magnification and such higher magnification objectives would require a different means of focusing.

Another limitation of the prior art system disclosed by Jensen is that the objectives require at least three lenses. It is impractical to provide a two lens achromatic system in which one lens is stationary in the housing while the other lens is adjustable with focusing because with such an objective it is not possible to correct optical errors such as color deviations and astigmatism. There is a further disadvantatge arising from the use of a movable objective member since because of its large diameter a relatively large guide shell is required to avoid peripheral restriction of the image.

In the prior art center focusing prism binocular the image rectification is effected by mirrors and prisms. The telescope has great structural length and the high degree of precision required of the mirror makes the telescope very expensive. The binocular of Jensen has a slight deviation from the optical linearity which is very annoying to an observer. In the Jensen binocular the three members of the ocular are spaced a considerable distance from one another and this naturally increases the overall dimensions of the binocular. The ocular of Jensen permits an objective image angle of only about 50° and although it is possible to enlarge the image angle, such an enlargement would in turn require a larger prism system because of the inclined positions of the mirror surface. This enlargement is also undesirable because of the increased cost and weight.

SUMMARY OF THE INVENTION

It is therefore an object of the present invention to avoid the limitations of the prior art and to produce a telescope of very small overall dimensions.

Another object of the present invention is to provide for the mounting of objectives of different magnification on the same supporting structure.

Still another object of the present invention is to increase the image angle to about 70° without increasing the diameter of the binocular casing.

A further object of the present invention is to decrease the amount of focusing movement required.

It is a particular object of the present invention to provide for the mounting and adjustment of a graticule relative to the prism system and the objective prior to insertion into the binocular casing.

Upon further study of the specification, drawings and claims, other objects and advantages of the present invention will become apparent.

According to the present invention a center focusing prism binocular is provided having an articulated bridge portion connecting two telescope casings each having an adjustable ocular, a three component prism system and a fixed objective therein.

The oculars are of the Erfle type with an objective field of about 70° and have a cemented member fixed in the eyepiece and two adjustable members mounted in a tubular sleeve. The tubular sleeve is connected to an adjusting knob at the axis of articulation. The fixed objective is a two lens achromatic objective.

The three component prism system in each casing has five reflecting surfaces. There are two Bauernfeind prisms and a right angle prism for each system. The first Bauernfeind prism has a first surface adjacent the objective and perpendicular to the objective axis. The light enters the first surface and is reflected by a second surface back to the first surface and from there to a third surface abutting and cemented to one of the surfaces of the right angle prism. From the base surface of the right angle prism the rays are reflected to the third surface which is cemented to the second Bauernfeind prism. After passage of the rays to the second cemented surface, the rays reach another surface which is perpendicular to the optic axis of both the ocular and objective.

In addition to the obvious advantages of the construction of the present invention wherein all the inner ocular members are adapted to serve as focusing elements, the accuracy of the guided movement is increased because of the length of the ocular sleeve. Because of the foreshortened focusing movement of the ocular of the present invention, there is only a slight outward displacement of the outlet pupil.

A graticule is suitably mounted on the base of the prism system. This mounting is facilitated because the graticule is shiftable on the upper surface of the prism, that is next to the ocular and this prism is perpendicular to the optic axis. The graticule holder is adjustable prior to being fixed in position.

The prism which is next to the ocular is provided with a roof edge which serves for lateral rectification.

The present invention provides a prism binocular with a straight line optical rectifying prism system which has water and dustproof means for focusing, and a compact and handy structure.

The prism system of the present invention provides for a graticule disposed adjacent the objective which is linked with the support of the prism system so as to permit adjustment of the position of the graticule relative to the prism system and the object prior to their insertion into the binocular case.

BRIEF DESCRIPTION OF THE DRAWINGS

While the specification concludes with claims particularly pointing out and distinctly claiming the subject matter which is regarded as the invention, it is believed that the invention, the objects, and features of the invention and further objects, features and advantages thereof will be better understood from the following description taken in conjunction with the accompanying drawings wherein:

FIGURE 1 illustrates in side elevation a prism binocular, one telescope thereof being shown in sectional view;

FIGURE 4 shows in modified form the focusing adjustment for the inner eyepiece shown in FIGURE 2; and FIGURE 5 is a fragmentary longitudinal sectional view of the telescope of FIGURE 1 having a built-in graticule.

Figure 2:
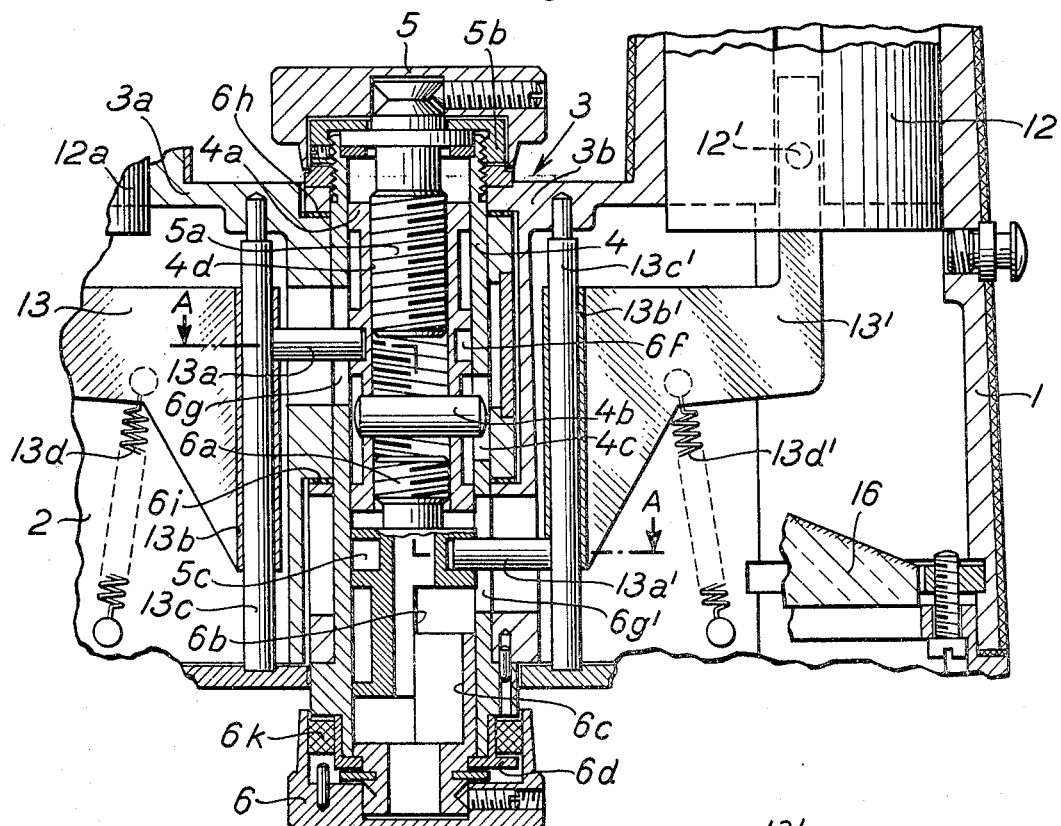
FIGURE 2 is an enlarged fragmentary view in cross section of the focusing mechanism of FIGURE 1.

With particular reference to FIGURE 1, the prism binocular shown having two casings 1 and 2 for the two telescopes interconnected by a bridge portion 3 which includes pivot links 4 for adjusting the binocular to the individual interpupilary distance of the observer. Knobs 5 and 6 are provided for focusing. Each casing includes an optical telescopic system comprising an ocular or eyepiece 7 of the Erfle type, a straight vision reversing prism 8 and a two lens achromatic objective 9.

Figure 3:
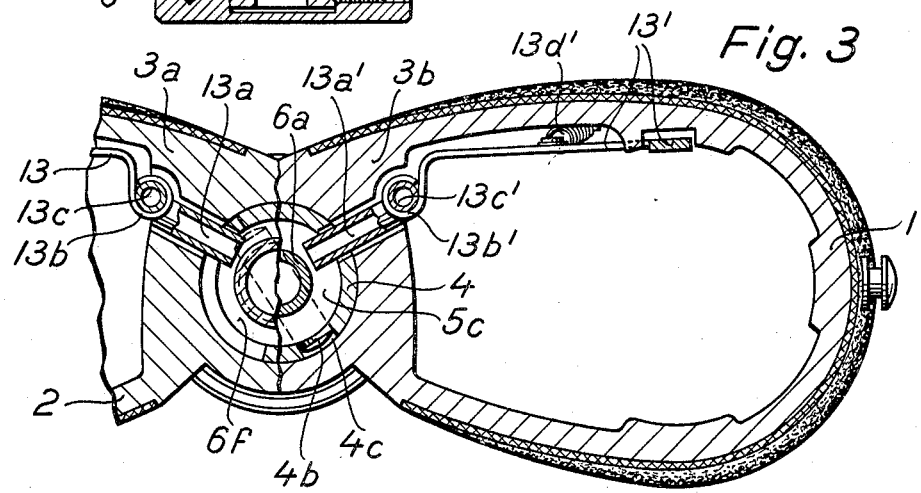
FIGURE 3 is a transverse section on the line A—A of FIGURE 2.

With particular reference to FIGURES 2 and 3, the two casings or housings 1 and 2 are shown connected to each other through a bridge portion 3 comprising articulated parts 3a and 3b. The parts 3a and 3b rotate about the pivot sleeve 4 in the middle of the bridge portion. Inside the sleeve 4 a cylindrical part 4a is held in position by the transverse pin 4b for rectilinear movement along the slot 4c in the sleeve 4. The cylindrical part 4a carries an internal screw thread 4d into the upper end of which the adjusting screw 5a of the focusing knob 5 is threaded. The adjusting screw 5a is held against axial movement by a retaining ring 5b on the adjacent end of sleeve 4.

Into the lower end of the internally threaded part 4a is screwed a bolt 6a whose head has on one side of it a cutaway portion 6b into which extends a lug 6c of a secondary focusing knob 6 to compensate for different visual characteristics of the two eyes. The knob 6 is rotatable but is prevented by a ring 6d on the lower end of the sleeve 4 from moving longitudinally. Sealing rings are provided at 6h, 6i and 6k.

The cylindrical part 4a has in its periphery an annular groove 6f into which extends a pin 13a which passes through an opening 6g in the pivot sleeve 4. The outer end of pin 13a is fastened to a sleeve 13b which is slidable on a bar 13c that is positioned parallel to the axis of the pivot sleeve 4. The bar 13c is carried by the part 3a of the bridge. The sleeve 13b has a carrier arm 13 extending from it for fine adjustment and a tension spring 13d is connected to the arm to facilitate smooth operation.

An annular groove 5c is also provided in the head of bolt 6a into which extends a pin 13a' which passes through opening 6g', in pivot sleeve 4. The pin 13a' is likewise connected at its outer end to a sleeve 13b' which is slidable on a bar 13c' that is positioned in the part 3b parallel to the axis of the pivot sleeve 4. The adjusting parts 13b' and 13' are analogous to the parts 13b and 13 previously described.

With particular reference to FIGURE 4, a lever 13e is shown mounted pivotally on axis 13g in fixed position in the housing. These pivotally mounted parts are a modification of the previously described axially shiftable sleeves 13b and 13b'. One end 13f of this lever 13e extends into the adjacent annular groove 6f of the sleeves 4a (or groove 5c of bolt 6a), while the other end of the lever is connected to its respective focusing element.

The optical system which is built into each casing comprises a three lens ocular 7 of the Erfle type, a straight line vision reversing prism 8, as well as the two lens achromatic objective 9. The outermost cemented lenses 10a and 10b of the ocular are carried in fixed position by the housing. The two inner members 11a and 11b are mounted in a barrel 12 which is axially shiftable for focusing. Member 11b is a cemented lens. The carrier arm 13' is connected by pin 12' at the barrel 12 with the central adjusting mount 5.

The prism system 8 is composed of a 90° reversing prism 14 and two Bauernfein prisms 15, 16 fitted together in such a manner that the light ray is reflected five times. The reflecting surface 17 of the prism 15 is in the form of a roof edge, while the portion 14a of the prism 14 extends into the bridge part 3b.

It is not necessary that prisms 14, 15 and 16 be cemented together, nor do they have to have engaging surfaces since light passing from prism 16 to prism 14, or from prism 14 to prism 15, respectively, passes through plane prism surfaces at a right angle thereto. Of course, for purposes of construction, the prisms 14, 15 and 16 will be cemented together to form a structural unit.

The three prisms together reflect the rays entering the casing through the objective 9 five times (see dash-dot line). Following the path of an incoming ray from the objective, this ray passes through the receiving surface of prism 16, which surface is perpendicular to the optical axis of objective 9.

The first reflection of the ray occurs at a mirroring surface which may be covered by a silver layer to avoid losses. The ray then passes back onto the receiving surface from which it is reflected by total reflection towards the cemented surfaces of prisms 14 and 16 and the ray is reflected, now for the third time, at the base surface of right angle prism 14. The ray then enters Bauernfeind prism 15 through the surface with which it abuts prism 14, and the fourth reflection (total reflection) occurs at the surface of prism 15 facing the eyepiece. The fifth reflection occurs at surface 17 and from there the light is directed into eyepiece 7 in axial direction.

The deviating surface 17 of prism 15 is preferably formed as a roof for rectification of the image. Otherwise the Bauernfeind prisms are symmetrical and similar so that objective 9 and eyepiece 7 are coaxial in casing 1.

FIGURE 5 illustrates a binocular which is basically similar to that shown in FIGURE 1, and includes all of the elements thereof. Additionally, however, there is provided a graticule 18 for measuring purposes. Graticule 18 is mounted on a tubular sleeve 19 engaging and being seated on surface 20 of prism 15. This is the surface of prism 15 facing the eyepiece and it is perpendicular to both, the optical axis of the objective and the axis of the eyepiece.

Sleeve 19 is connected to two links 21, only one thereof being shown. The other one is parallel thereto and appears above the plane of the drawing. These links are pivoted at 22 to opposite sides of sleeve 19.

The respective links 21 are secured to base support 23 of prism chair 24 which supports the prism system 8. There is a longitudinal slot 25 in the remote end of each link 21 which receives a locking or clamping screw 26 with which each link is releasably and adjustably connected to support 23. This mode of connecting sleeve 19 ensures that the graticule 18 does not participate in the adjustment of tubular member 12, even though graticule 18 optically pertains to the eyepiece 7.

The position of graticule 18 within the optical path is readily adjustable during assembling. Adjustment is attained prior to insertion of prism system 8 into the casing. During manufacture, sleeve 19 is first seated on the surface 20 of prism 15, the links 21 then being already connected at pivots 22 to sleeve 19.

Together with the objective 9, the elements 8 and 18, 19 are then placed into the desired relative position to each other. This might require sleeve 19 with graticule to be shifted laterally on surface 20 which means, that sleeve 19 with pivoted links 21 is shifted relative to support 23 so that the accurate distance between the hole in support 23 receiving the clamping screw 26 and pivot point 22 is not predetermined but adjusted during assembling. This is the reason for providing slot 25.

After an accurate position of graticule 18 to the optical axis of objective 9 has been attained, the links 21 are screwed onto support 23 by the aforementioned clamping screw 26 (one for each lever); finally elements 9, 8, 23, 24 and 18, 19 are together introduced into casing 1 (or 2) and thereafter they are correspondingly positioned therein.

DESCRIPTION OF THE USE OF THE PREFERRED EMBODIMENT

The manner of operation of the focusing mechanism is as follows:

By rotation of the adjusting knob 5, the threaded spindle 5a causes the cylindrical part 4a to move in the axial direction. By engagement of the transverse bolt 4b with the slot 4c, its movement is rectilinear without rotation. The same movement is also imparted to the threaded bolt 6a which is screwed into the cylindrical part 4a. Rectilinear movement of the bolt 6a is assured by the parts 6b and 6c. These axial movements are at the same time imparted to the parts 13a, 13b and 13', in housing body 2, and to parts 13a', 13b' and 13' in housing body 1.

The carrier arms 13, 13' are connected respectively with the barrels 12, 12a for shifting them relatively through stationary oculars 10a and 10b to effect the desired focusing in both casings. At the same time, with the pins 13a and 13a' fitting into annular grooves, the articulated bridge parts 3a and 3b are adjusted toward or from each other in accordance with the distance between the eyes.

If now the binocular is also to be adjusted for visual differences between the two eyes, then this is accomplished by actuating the knob 6 whose rotation is transmitted by the parts 6b and 6c to the bolt 6a, which because of its threaded connection with the now stationary cylindrical part 4a, moves in the axial direction. During this last adjustment it is only the carrier arms 13' which move relative to the other arm 13.

It will be understood that this invention is susceptible to modification in order to adapt it to different usages and conditions and accordingly, it is desired to comprehend such modifications within this invention as well may fall within the scope of the appended claims.

We claim:
1. A center focusing prism binocular comprising an articulated central bridge portion carrying on each side of it a tubular telescope casing, single focusing means for both casings actuated by an externally screw-threaded central control member rotatably engaging an internally screw-threaded longitudinally movable but non-rotatable part consisting of two members adjustable longitudinally relative to each other by a single knob coaxial with the central control member, each tubular telescope casing having mounted therein an Erfle type eyepiece with three lens members, the outermost lens member being secured in fixed position to its casing, an axially adjustable sleeve for each eyepiece and supporting the two remaining lens members thereof, said sleeve being surrounded by said casing on which the articulated bridge portion is supported, motion transmitting means connected to said single focusing means and said adjustable sleeves on each side thereof, to transmit the focusing movements of the two longitudinally adjustable members to the axially adjustable sleeves of their respective eyepieces, a stationary guide element in the bridge portion along the side of each casing and along which the motion transmitting means on the same side is slidable, a two-lens achromatic objective in fixed position in the outer end of each casing in axial alignment with its eyepiece and a Bauernfeind type prism system with five internal reflections in each casing, the optical paths in front of and behind the prism system being in alignment with each other.

2. The binocular of claim 1 in combination with a graticule positioned between the eyepiece and the prism system and carried by a supporting sleeve seated directly on the surface of the Bauernfeind prism that faces toward its respective eyepieces, the supporting sleeve being held in place by a pair of links, one end of each link being pivotally connected to the supporting sleeve while the other end of each link is adjustably clamped to a fixed part of the housing.

References Cited

UNITED STATES PATENTS

| 2,282,632 | 5/1942 | Wittig | 350—36 |
| 2,392,154 | 1/1946 | Kende | 350—71 |
| 2,456,521 | 12/1948 | Maxwell | 350—53 |
| 2,811,895 | 11/1957 | Jensen | 350—76 |

FOREIGN PATENTS

| 195,467 | 2/1907 | Germany. |
| 931,982 | 7/1955 | Germany. |

DAVID SCHONBERG, Primary Examiner

P. R. GILLIAM, Assistant Examiner

U.S. Cl. X.R.

350—10, 36, 44, 77, 287